(12) United States Patent
Chui

(10) Patent No.: US 7,349,136 B2
(45) Date of Patent: Mar. 25, 2008

(54) METHOD AND DEVICE FOR A DISPLAY HAVING TRANSPARENT COMPONENTS INTEGRATED THEREIN

(75) Inventor: Clarence Chui, San Mateo, CA (US)

(73) Assignee: IDC, LLC, San Francisco, CA (US)

( * ) Notice: Subject to any disclaimer, the term of this patent is extended or adjusted under 35 U.S.C. 154(b) by 286 days.

(21) Appl. No.: 11/139,108

(22) Filed: May 27, 2005

(65) Prior Publication Data

US 2006/0077151 A1 Apr. 13, 2006

Related U.S. Application Data

(60) Provisional application No. 60/613,290, filed on Sep. 27, 2004.

(51) Int. Cl.
*G02F 1/00* (2006.01)
*G02F 1/03* (2006.01)
*G02F 1/1333* (2006.01)
*G09G 3/34* (2006.01)

(52) U.S. Cl. .............. 359/237; 359/245; 359/290; 359/321; 349/122; 345/84; 348/196; 385/40

(58) Field of Classification Search ............ 359/290, 359/291, 295, 298, 321, 223, 224, 237, 276, 359/277, 245, 286; 345/33, 84, 85; 349/10, 349/122, 185; 348/196, 197; 385/40, 131, 385/147; 250/370.08, 370.09, 214.1, 389
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,567,847 A * | 3/1971 | Price ............. | 348/196 |
| 3,616,312 A | 10/1971 | McGriff et al. | |
| 3,653,741 A | 4/1972 | Marks | |
| 3,656,836 A | 4/1972 | de Cremoux et al. | |
| 3,699,242 A * | 10/1972 | Price ............. | 348/196 |

(Continued)

FOREIGN PATENT DOCUMENTS

CH 681 047 12/1992

(Continued)

OTHER PUBLICATIONS

Austrian Search Report for EX72/2005 dated May 13, 2005.

(Continued)

*Primary Examiner*—Loha Ben
(74) *Attorney, Agent, or Firm*—Knobbe, Martens, Olson & Bear LLP

(57) ABSTRACT

A display panel includes an array of interferometric modulators arranged over a transparent substrate and a transparent electrical device arranged between the array of interferometric modulators and the transparent substrate. The transparent electrical device may be electrically connected to the array of interferometric modulators or to other parts of the display panel. Examples of suitable transparent electrical devices include capacitors, resistors, inductors and filters. The use of such transparent electrical devices may provide various advantages, such as increased design flexibility, by allowing the electrical devices to be included in various parts of the array, including the viewing regions.

32 Claims, 9 Drawing Sheets

U.S. PATENT DOCUMENTS

| | | |
|---|---|---|
| 3,725,868 A | 4/1973 | Malmer, Jr. et al. |
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,617,608 A | 10/1986 | Blonder et al. |
| 4,660,938 A * | 4/1987 | Kazan ................ 359/245 |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Kitagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A * | 10/1992 | Link et al. .................. 359/286 |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,299,041 A | 3/1994 | Morin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,330,617 A | 7/1994 | Haond |
| 5,331,454 A | 7/1994 | Hornbeck |
| 5,339,116 A | 8/1994 | Urbanus et al. |
| 5,345,328 A | 9/1994 | Fritz et al. |
| 5,347,377 A | 9/1994 | Revelli, Jr. et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,503,952 A | 4/1996 | Suzuki et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |

| | | | | | | | |
|---|---|---|---|---|---|---|---|
| 5,600,383 | A | 2/1997 | Hornbeck | 6,194,323 | B1 | 2/2001 | Downey et al. |
| 5,602,671 | A | 2/1997 | Hornbeck | 6,195,196 | B1 | 2/2001 | Kimura et al. |
| 5,606,441 | A | 2/1997 | Florence et al. | 6,201,633 | B1 | 3/2001 | Peeters et al. |
| 5,608,468 | A | 3/1997 | Gove et al. | 6,204,080 | B1 | 3/2001 | Hwang |
| 5,610,438 | A | 3/1997 | Wallace et al. | 6,232,936 | B1 | 5/2001 | Gove et al. |
| 5,610,624 | A | 3/1997 | Bhuva | 6,243,149 | B1 | 6/2001 | Swanson et al. |
| 5,610,625 | A | 3/1997 | Sampsell | 6,246,398 | B1 | 6/2001 | Koo |
| 5,619,059 | A | 4/1997 | Li et al. | 6,249,039 | B1 | 6/2001 | Harvey et al. |
| 5,619,365 | A | 4/1997 | Rhoades et al. | 6,282,010 | B1 | 8/2001 | Sulzbach et al. |
| 5,619,366 | A | 4/1997 | Rhoads et al. | 6,284,560 | B1 | 9/2001 | Jech et al. |
| 5,622,814 | A | 4/1997 | Miyata et al. | 6,295,154 | B1 | 9/2001 | Laor et al. |
| 5,629,790 | A | 5/1997 | Neukermans et al. | 6,323,982 | B1 | 11/2001 | Hornbeck |
| 5,633,652 | A | 5/1997 | Kanbe et al. | 6,327,071 | B1 | 12/2001 | Kimura et al. |
| 5,636,052 | A | 6/1997 | Arney et al. | 6,329,297 | B1 | 12/2001 | Balish et al. |
| 5,636,185 | A | 6/1997 | Brewer et al. | 6,335,831 | B2 | 1/2002 | Kowarz et al. |
| 5,638,084 | A | 6/1997 | Kalt | 6,351,329 | B1 | 2/2002 | Greywal |
| 5,638,946 | A | 6/1997 | Zavracky | 6,356,254 | B1 | 3/2002 | Kimura |
| 5,641,391 | A | 6/1997 | Hunter et al. | 6,359,673 | B1 * | 3/2002 | Stephenson ................. 349/185 |
| 5,646,768 | A | 7/1997 | Kaeiyama | 6,376,787 | B1 | 4/2002 | Martin et al. |
| 5,647,819 | A | 7/1997 | Fujita et al. | 6,377,233 | B2 * | 4/2002 | Colgan et al. ................. 345/84 |
| 5,650,834 | A | 7/1997 | Nakagawa et al. | 6,391,675 | B1 | 5/2002 | Ehmke et al. |
| 5,650,881 | A | 7/1997 | Hornbeck | 6,392,233 | B1 | 5/2002 | Channin et al. |
| 5,654,741 | A | 8/1997 | Sampsell et al. | 6,392,781 | B1 | 5/2002 | Kim et al. |
| 5,657,099 | A | 8/1997 | Doherty et al. | 6,407,851 | B1 | 6/2002 | Islam et al. |
| 5,659,374 | A | 8/1997 | Gale, Jr. et al. | 6,447,126 | B1 | 9/2002 | Hornbeck |
| 5,665,997 | A | 9/1997 | Weaver et al. | 6,452,465 | B1 | 9/2002 | Brown et al. |
| 5,673,139 | A | 9/1997 | Johnson | 6,456,420 | B1 | 9/2002 | Goodwin-Johansson |
| 5,674,757 | A | 10/1997 | Kim | 6,465,355 | B1 | 10/2002 | Horsley |
| 5,683,591 | A | 11/1997 | Offenberg | 6,466,354 | B1 | 10/2002 | Gudeman |
| 5,703,710 | A | 12/1997 | Brinkman et al. | 6,466,358 | B2 | 10/2002 | Tew |
| 5,706,022 | A | 1/1998 | Hato | 6,473,274 | B1 | 10/2002 | Maimone et al. |
| 5,710,656 | A | 1/1998 | Goosen | 6,480,177 | B2 | 11/2002 | Doherty et al. |
| 5,726,480 | A | 3/1998 | Pister | 6,496,122 | B2 | 12/2002 | Sampsell |
| 5,737,050 | A * | 4/1998 | Takahara et al. ............. 349/122 | 6,513,911 | B1 | 2/2003 | Ozaki et al. |
| 5,739,945 | A | 4/1998 | Tayebati | 6,522,801 | B1 | 2/2003 | Aksyuk et al. |
| 5,745,193 | A | 4/1998 | Urbanus et al. | 6,531,945 | B1 | 3/2003 | Ahn et al. |
| 5,745,281 | A | 4/1998 | Yi et al. | 6,537,427 | B1 | 3/2003 | Raina et al. |
| 5,771,116 | A | 6/1998 | Miller et al. | 6,545,335 | B1 | 4/2003 | Chua et al. |
| 5,784,190 | A | 7/1998 | Worley | 6,548,908 | B2 | 4/2003 | Chua et al. |
| 5,784,212 | A | 7/1998 | Hornbeck | 6,549,338 | B1 | 4/2003 | Wolverton et al. |
| 5,793,504 | A | 8/1998 | Stoll | 6,552,840 | B2 | 4/2003 | Knipe |
| 5,808,780 | A | 9/1998 | McDonald | 6,574,033 | B1 | 6/2003 | Chui et al. |
| 5,818,095 | A | 10/1998 | Sampsell | 6,577,785 | B1 | 6/2003 | Spahn et al. |
| 5,822,170 | A | 10/1998 | Cabuz et al. | 6,589,625 | B1 | 7/2003 | Kothari et al. |
| 5,824,608 | A | 10/1998 | Gotoh et al. | 6,600,201 | B2 | 7/2003 | Hartwell et al. |
| 5,825,528 | A | 10/1998 | Goosen | 6,606,175 | B1 | 8/2003 | Sampsell et al. |
| 5,835,255 | A | 11/1998 | Miles | 6,608,268 | B1 | 8/2003 | Goldsmith |
| 5,838,484 | A | 11/1998 | Goossen et al. | 6,610,440 | B1 | 8/2003 | LaFollette et al. |
| 5,842,088 | A | 11/1998 | Thompson | 6,625,047 | B2 | 9/2003 | Coleman, Jr. |
| 5,867,302 | A | 2/1999 | Fleming et al. | 6,630,786 | B2 | 10/2003 | Cummings et al. |
| 5,912,758 | A | 6/1999 | Knipe et al. | 6,632,698 | B2 | 10/2003 | Ives |
| 5,943,158 | A | 8/1999 | Ford et al. | 6,635,919 | B1 | 10/2003 | Melendez et al. |
| 5,959,763 | A | 9/1999 | Bozler et al. | 6,642,913 | B1 | 11/2003 | Kimura et al. |
| 5,972,193 | A | 10/1999 | Chou et al. | 6,643,069 | B2 | 11/2003 | Dewald |
| 5,976,902 | A | 11/1999 | Shih | 6,650,455 | B2 | 11/2003 | Miles |
| 5,986,796 | A | 11/1999 | Miles | 6,657,832 | B2 | 12/2003 | Williams et al. |
| 6,016,693 | A | 1/2000 | Viani et al. | 6,666,561 | B1 | 12/2003 | Blakley |
| 6,028,690 | A | 2/2000 | Carter et al. | 6,674,562 | B1 | 1/2004 | Miles et al. |
| 6,038,056 | A | 3/2000 | Florence et al. | 6,674,563 | B2 | 1/2004 | Chui et al. |
| 6,040,937 | A | 3/2000 | Miles | 6,680,792 | B2 | 1/2004 | Miles |
| 6,049,317 | A | 4/2000 | Thompson et al. | 6,687,896 | B1 | 3/2004 | Miles |
| 6,055,090 | A | 4/2000 | Miles | 6,710,908 | B2 | 3/2004 | Miles et al. |
| 6,057,903 | A | 5/2000 | Colgan et al. | 6,720,267 | B1 | 4/2004 | Chen et al. |
| 6,061,075 | A | 5/2000 | Nelson et al. | 6,736,987 | B1 | 5/2004 | Cho |
| 6,099,132 | A | 8/2000 | Kaeriyama | 6,741,377 | B2 | 5/2004 | Miles |
| 6,100,872 | A | 8/2000 | Aratani et al. | 6,741,384 | B1 | 5/2004 | Martin et al. |
| 6,113,239 | A | 9/2000 | Sampsell et al. | 6,741,503 | B1 | 5/2004 | Farris et al. |
| 6,115,326 | A | 9/2000 | Puma et al. | 6,743,570 | B2 | 6/2004 | Harnett et al. |
| 6,147,790 | A | 11/2000 | Meier et al. | 6,747,785 | B2 | 6/2004 | Chen et al. |
| 6,158,156 | A | 12/2000 | Patrick | 6,747,800 | B1 | 6/2004 | Lin |
| 6,160,833 | A | 12/2000 | Floyd et al. | 6,756,317 | B2 | 6/2004 | Sniegowski et al. |
| 6,166,422 | A | 12/2000 | Qian et al. | 6,768,097 | B1 | 7/2004 | Viktorovitch et al. |
| 6,180,428 | B1 | 1/2001 | Peeters et al. | 6,775,174 | B2 | 8/2004 | Huffman et al. |

| | | |
|---|---|---|
| 6,778,155 B2 | 8/2004 | Doherty et al. |
| 6,778,306 B2 | 8/2004 | Sniegowski et al. |
| 6,782,166 B1 * | 8/2004 | Grote et al. ............ 385/40 |
| 6,794,119 B2 | 9/2004 | Miles |
| 6,811,267 B1 | 11/2004 | Allen et al. |
| 6,812,482 B2 | 11/2004 | Fleming et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,905,621 B2 | 6/2005 | Ho et al. |
| 6,912,022 B2 | 6/2005 | Lin et al. |
| 6,952,303 B2 | 10/2005 | Lin et al. |
| 6,952,304 B2 | 10/2005 | Mushika et al. |
| 6,958,847 B2 | 10/2005 | Lin |
| 6,980,350 B2 | 12/2005 | Hung et al. |
| 6,982,820 B2 | 1/2006 | Tsai |
| 6,995,890 B2 | 2/2006 | Lin |
| 6,999,225 B2 | 2/2006 | Lin |
| 6,999,236 B2 | 2/2006 | Lin |
| 7,184,202 B2 * | 2/2007 | Miles et al. ............ 359/321 |
| 2001/0003487 A1 | 6/2001 | Miles |
| 2001/0026951 A1 | 10/2001 | Vergani et al. |
| 2001/0040649 A1 | 11/2001 | Ozaki |
| 2001/0040675 A1 | 11/2001 | True et al. |
| 2001/0055208 A1 | 12/2001 | Kimura |
| 2002/0015215 A1 | 2/2002 | Miles |
| 2002/0021485 A1 | 2/2002 | Pilossof |
| 2002/0024711 A1 | 2/2002 | Miles |
| 2002/0036304 A1 | 3/2002 | Ehmke et al. |
| 2002/0054424 A1 | 5/2002 | Miles |
| 2002/0055253 A1 | 5/2002 | Rudhard |
| 2002/0071169 A1 | 6/2002 | Bowers et al. |
| 2002/0075555 A1 | 6/2002 | Miles |
| 2002/0086455 A1 | 7/2002 | Franosch et al. |
| 2002/0126364 A1 | 9/2002 | Miles |
| 2002/0135857 A1 | 9/2002 | Fitzpatrick et al. |
| 2002/0137072 A1 | 9/2002 | Mirkin et al. |
| 2002/0145185 A1 | 10/2002 | Shrauger |
| 2002/0149828 A1 | 10/2002 | Miles |
| 2002/0168136 A1 | 11/2002 | Atia et al. |
| 2003/0006468 A1 | 1/2003 | Ma et al. |
| 2003/0007107 A1 | 1/2003 | Sung et al. |
| 2003/0043157 A1 | 3/2003 | Miles |
| 2003/0054588 A1 | 3/2003 | Patel et al. |
| 2003/0062186 A1 | 4/2003 | Boroson et al. |
| 2003/0072070 A1 | 4/2003 | Miles |
| 2003/0090350 A1 | 5/2003 | Feng et al. |
| 2003/0112096 A1 | 6/2003 | Potter |
| 2003/0138213 A1 | 7/2003 | Jiin et al. |
| 2003/0152872 A1 | 8/2003 | Miles |
| 2003/0201784 A1 | 10/2003 | Potter |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0231373 A1 | 12/2003 | Kowarz et al. |
| 2004/0010115 A1 | 1/2004 | Sotzing |
| 2004/0027636 A1 | 2/2004 | Miles |
| 2004/0027701 A1 | 2/2004 | Ishikawa |
| 2004/0028849 A1 | 2/2004 | Stark et al. |
| 2004/0035821 A1 | 2/2004 | Doan et al. |
| 2004/0051929 A1 | 3/2004 | Sampsell et al. |
| 2004/0053434 A1 | 3/2004 | Bruner |
| 2004/0058531 A1 | 3/2004 | Miles et al. |
| 2004/0058532 A1 | 3/2004 | Miles et al. |
| 2004/0061543 A1 | 4/2004 | Nam et al. |
| 2004/0063322 A1 | 4/2004 | Yang |
| 2004/0080807 A1 | 4/2004 | Chen et al. |
| 2004/0080832 A1 | 4/2004 | Singh |
| 2004/0087086 A1 | 5/2004 | Lee |
| 2004/0100677 A1 | 5/2004 | Huibers et al. |
| 2004/0124073 A1 | 7/2004 | Pilans et al. |
| 2004/0125281 A1 | 7/2004 | Lin |
| 2004/0125282 A1 | 7/2004 | Lin et al. |
| 2004/0125536 A1 | 7/2004 | Arney et al. |
| 2004/0136076 A1 | 7/2004 | Tayebati |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0148009 A1 | 7/2004 | Buzzard et al. |
| 2004/0150869 A1 | 8/2004 | Kasai |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0191937 A1 | 9/2004 | Patel et al. |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240027 A1 | 12/2004 | Lin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0003667 A1 | 1/2005 | Lin et al. |
| 2005/0020089 A1 | 1/2005 | Shi et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0078348 A1 | 4/2005 | Lin |
| 2005/0157364 A1 | 7/2005 | Lin |
| 2005/0168849 A1 | 8/2005 | Lin |
| 2005/0195462 A1 | 9/2005 | Lin |
| 2005/0195467 A1 | 9/2005 | Kothari et al. |
| 2005/0202649 A1 | 9/2005 | Hung et al. |
| 2006/0066932 A1 | 3/2006 | Chui et al. |

FOREIGN PATENT DOCUMENTS

| | | |
|---|---|---|
| CN | 157313 | 5/1991 |
| CN | 092109265 | 11/2003 |
| DE | 10228946 A1 | 1/2004 |
| EP | 0173808 | 3/1986 |
| EP | 0 667 548 A1 | 8/1995 |
| EP | 0694801 A | 1/1996 |
| EP | 0695959 A | 2/1996 |

| | | | |
|---|---|---|---|
| EP | 0878824 A2 | 11/1998 | |
| EP | 1197778 A | 4/2002 | |
| EP | 1258860 A1 | 11/2002 | |
| EP | 1 452 481 A | 9/2004 | |
| JP | 05275401 A1 | 10/1993 | |
| JP | 10500224 | 1/1998 | |
| JP | 10-148644 | 6/1998 | |
| JP | 10-267658 | 10/1998 | |
| JP | 11211999 A | 8/1999 | |
| JP | 11243214 | 9/1999 | |
| JP | 2000-40831 A | 2/2000 | |
| JP | 2002 062493 | 2/2002 | |
| JP | 2002-270575 | 9/2002 | |
| JP | 2002-355800 | 12/2002 | |
| JP | 2003001598 A | 1/2003 | |
| JP | 2004-102022 A | 4/2004 | |
| JP | 2004106074 A | 4/2004 | |
| JP | 2004-212656 | 7/2004 | |
| JP | 2005051007 A | 2/2005 | |
| KR | 2002-9270 | 10/1999 | |
| KR | 2000-0033006 | 6/2000 | |
| WO | WO 92/10925 | 6/1992 | |
| WO | WO9530924 | 11/1995 | |
| WO | WO9717628 | 5/1997 | |
| WO | WO9952006 A2 | 10/1999 | |
| WO | WO9952006 A3 | 10/1999 | |
| WO | WO0114248 | 3/2001 | |
| WO | WO 02/24570 | 3/2002 | |
| WO | WO2006/036542 | 4/2002 | |
| WO | WO03007049 A1 | 1/2003 | |
| WO | WO 03/052506 | 6/2003 | |
| WO | WO 03/069413 A | 8/2003 | |
| WO | WO03069413 A1 | 8/2003 | |
| WO | WO03073151 A1 | 9/2003 | |
| WO | WO2004006003 A1 | 1/2004 | |
| WO | WO2004026757 A2 | 4/2004 | |
| WO | WO 2005/019899 A1 | 3/2005 | |
| WO | WO 2005/085932 A | 9/2005 | |
| WO | WO 2006/036385 | 4/2006 | |
| WO | WO 2006/036437 | 4/2006 | |

OTHER PUBLICATIONS

Austrian Search Report for EX81/2005 dated May 18, 2005.
Austrian Search Report for EX170/2005 dated Jul. 6, 2005.
Austrian Search Report for EX139/2005 dated Jul. 27, 2005.
Austrian Search Report for EX144/2005 dated Aug. 11, 2005.
Bains, "Digital Paper Display Technology Holds Promise for Portables," CommsDesign EE Times (2000).
Chu, et al. "Formation and Microstructures of Anodic Aluminoa Films from Aluminum Sputtered onglass Substrate" Journal of the Electrochemical Society, 149 (7) B321-B327 (2002).
Crouse, "Self-ordered pore structure of anodized aluminum on silicon and pattern transfer" Applied Physics Letters, vol. 76. No. 1, Jan. 3, 2000. pp. 49-51.
French, P.J. "Development of Surface Micromachining techniques compatable with on-chip electronics" Journal of Micromechanics and Microengineering vol. 6 No. 2, 197-211 XP 002360789 Jun. (1996) IOP Publishing.
Furneaux, et al. "The Formation of Controlled-porosity membranes from Anodically Oxidized Aluminium" Nature vol. 337 Jan. 12, 1989, pp. 147-149.
Jerman J. H. et al. "Maniature Fabry-Perot Interferometer Micromachined in Silicon for Use in Optical Fiber WDM Systems," Transducers, San Francisco, Jun. 24-27, 1991, Proceedings of the International Conference on Solid State Sensors Andactuators, New York IEEE, US, vol. Conf. 6, Jun. 24, 1991.
Lieberman, "MEMS Display Looks to Give PDAs Sharper Image," EE Times (Feb. 11, 1997).
Lieberman, "Microbridges at Heart of New MEMS Displays," EE Times (Apr. 24, 1997).

Maboudian, et al. Critical Review: Adhesion in Surface Micromechanical Structures: J. Vac. Sci Techno. B 15(1) Jan./Feb. 1997, pp. 1-20.
Microchem, LOR Lift-Off Resists Datasheet, 2002.
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
Miles, et al., "10.1: Digital Paper for Reflective Displays," 2002 SID International Symposium Digest of Technical Papers, Boston, MA, SID International Symposium Digest of Technical Papers, San Jose, CA, vol. 33 / 1, pp. 115-117 (May 21-23, 2002).
Penta Vacuum MEMS Etcher Specifications, http://www.pentavacuum.com/memes.htm.
Science and Technology, The Economist, pp. 89-90, (May 1999).
Search Report PCT/US05/031237 (Dec. 29, 2005).
Search Report PCT/US05/030033 and Written Opinion.
Search Report PCT/US05/030902.
Search Report and Written Opinion for PCT/US05/33558 (May 19, 2005).
Search Report PCT/US05/032331 (Apr. 7, 2006).
Search Report PCT/US05/032331 (Jan. 9, 2006).
Search Report and Written Opinion for PCT/US05/032647.
Tayebi et al. "Reducing the Effects of adhesion and friction in microelectomechanical systesm (MEMS) through surface roughening: Comparison Between theory and experiments" http://jap.ajp.org/jap/copyright.isp Journal of applied Physics 98, 073528 (2005).
Thin Film Transistors- Materials and Processes -Volume 1 Amorphous Silicon Thin Film Transistors ed. Yue Kuo, Kluwer Academic Publishers, Boston (2004).
Xactix Xetch X Specifications, http://xactix.com/Xtech X3specs.htm. Jan. 5, 2005.
Xactix Xetch Product information.
Austrian Search Report dated May 4, 2005.
Austrian Search Report dated Aug. 12, 2005.
EP 05255661.0 European Search Report (Dec. 30, 2005).
Fan et al., "Channel Drop Filters in Photonic Crystals," Optics Express, vol. 3, No. 1 (1998).
Goossen K. W., "Mems-Based Variable Optical Interference Devices", Optical Mems, 2000 IEEE/Leos International Conference on Aug. 21-24, 2000, Piscataway, NJ, USA, IEE, Aug. 21, 2000, pp. 17-18.
Harnett et al., "Heat-depolymerizable polycarbonates as electron beam patternable sacrificial layers for nanofluidies," J. Vac. Sci. Technol. B 19(6), (Nov/Dec 2001), 2842-2845.
Joannopoulos et al., "Photonic Crystals: Molding the Flow of Light," Princeton University Press (1995).
Kim et al., "Control of Optical Transmission Through Metals Perforated With Subwavelength Hole Arrays," Optic Letters, vol. 24, No. 4, pp. 256-257, (Feb. 1999).
Lee et al., "Electrostatic Actuation of Surface/Bulk Micromachined Single-Crystal Silicon Microresonators", International Conference on Intelligent Robots ans Systems, vol. 2, pp. 1057-1062, (Oct. 17-21, 1999).
Lee et al., "The Surface/Bulk Micromachining (SBM) Process: A New Method for Fabricating Released Mems in Single Crystal Silicon", Journal of Microelectromechanical Systems, vol. 8, Issue 4, pp. 409-416, (Dec. 1999).
Lin et al., "Free-Space Micromachined Optical Switches for Optical Networking," IEEE Journal of Selected Topics in Quantum Electronics, vol. 5, No. 1, pp. 4-9. (Jan./Feb. 1999).
Little et al., "Vertically Coupled Microring Resonator Channel Dropping Filter," IEEE Photonics Technology Letters, vol. 11, No. 2, (1999).
Magel, "Integrated Optic Devices Using Micromachined Metal Membranes," SPIE vol. 2686, 0-8194-2060-Mar. (1996).
Nagami et al., "Plastic Cell Architecture: Towards Reconfigurable Computing for General-Purpose," IEEE, 0-8186-8900-, pp. 68-77, (May 1998).
PCT/US02/13442, Search Report Sep. 13, 2002.
PCT/US04/20330 Search Report Nov. 8, 2004.
PCT/US05/029821 International Search Report (Dec. 27, 2005).
PCT/US05/030927-International Search Report (Jan. 25, 2006).

PCT/US05/031693 International Search Report.

PCT/US05/032231 International Search Report (Apr. 7, 2006).

PCT/US05/033558 Partial International Search Report (Feb. 24, 2006).

PCT/US2004/035820 International Search Report and Written Opinion (Apr. 11, 2005).

PCT/US96/17731 Search Report.

Sridharan et al. "Post-Packaging Release a New Concept for Surface-Micromachined Devices" Technical Digest, IEEE Solid-State Sensor & Actuator Workshop, New York, NY, US, Nov. 8, 1998, pp. 225-228, XP000992464.

Zhou et al., "Wavelength Panel Display Using Electromechanical Spatial Modulators" SID Digest, vol. XXIX (1998).

Akasaka, "Three-Dimensional IC Trends", Proceedings of IEEE, vol. 74, No. 12, pp. 1703-1714, (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23 (1994).

Bass, "Handbook of Optics, vol. I, Fundamentals, Techniques, and Design, Second Edition," McGraw-Hill, Inc., New York, pp. 2.29-2.36 (1995).

Conner, "Hybrid Color Display Using Optical Interference Filter Array," SID Digest, pp. 577-580 (1993).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanicallly-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics", John Wiley & Sons Inc., pp. 568-573, date unknown.

Jerman et al., "Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Schnakenberg, et al., TMAHW Etchants for Silicon Micromachining. 1991 International Conference on Solid State Sensors and Actuators-Digest of Technical Papers. pp. 815-818.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill pp. 340-343, (1963).

Walker, et al., "Electron-beam-tunable Interference Filter Spatial Light Modulator", Optics Letters vol. 13, No. 5, pp. 345-347, (May 1988).

Williams, et al., Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Winton, John M., "A novel way to capture solar energy", Chemical Week, (May 1985).

Wu, "Design of a Reflective Color LCD Optical Interference Reflectors", ASIA Display '95, pp. 929-931, (Oct. 1995).

European Search Report for EP Patent Application No.: 05255645.3—1528 dated Feb. 5, 2007.

* cited by examiner

|  | +$V_{bias}$ | -$V_{bias}$ |
|---|---|---|
| 0 | Stable | Stable |
| +ΔV | Relax | Actuate |
| −ΔV | Actuate | Relax |

Column Output Signals / Row Output Signals

METHOD AND DEVICE FOR A DISPLAY HAVING TRANSPARENT COMPONENTS INTEGRATED THEREIN

CROSS-REFERENCE TO RELATED APPLICATION

This application claims priority to U.S. Provisional Application No. 60/613,290, filed Sep. 27, 2004, which is hereby incorporated by reference in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The systems, methods, and devices described herein each have several aspects, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the various embodiments described herein provide advantages over other methods and display devices.

An embodiment provides a display panel that includes an array of interferometric modulators arranged over a transparent substrate, and a transparent electrical device arranged between the array of interferometric modulators and the transparent substrate, the transparent electrical device being electrically connected to the array of interferometric modulators.

Another embodiment provides a display device that includes a substrate that includes an array region, an interferometric modulator attached to the substrate in the array region, and a transparent passive electrical device attached to the substrate in the array region.

Another embodiment provides a method of making a display device. The method includes forming a transparent electrical device on a substrate, depositing an insulating layer over the transparent electrical device, forming an interferometric modulator over the insulating layer, and forming an electrical connection between the transparent electrical device and the interferometric modulator.

These and other embodiments are described in greater detail below.

BRIEF DESCRIPTION OF THE DRAWINGS

These and other aspects of this invention will now be described with reference to the drawings of preferred embodiments (not to scale) which are intended to illustrate and not to limit the invention.

DETAILED DESCRIPTION OF THE PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

An embodiment provides a display panel in which transparent electrical devices are arranged between a substrate and an array of interferometric modulators. Examples of suitable transparent electrical devices include capacitors, resistors, inductors and filters. The use of such transparent electrical devices may provide various advantages, such as increased design flexibility, by allowing the electrical devices to be included in various parts of the array, including the viewing regions.

Figure 1:
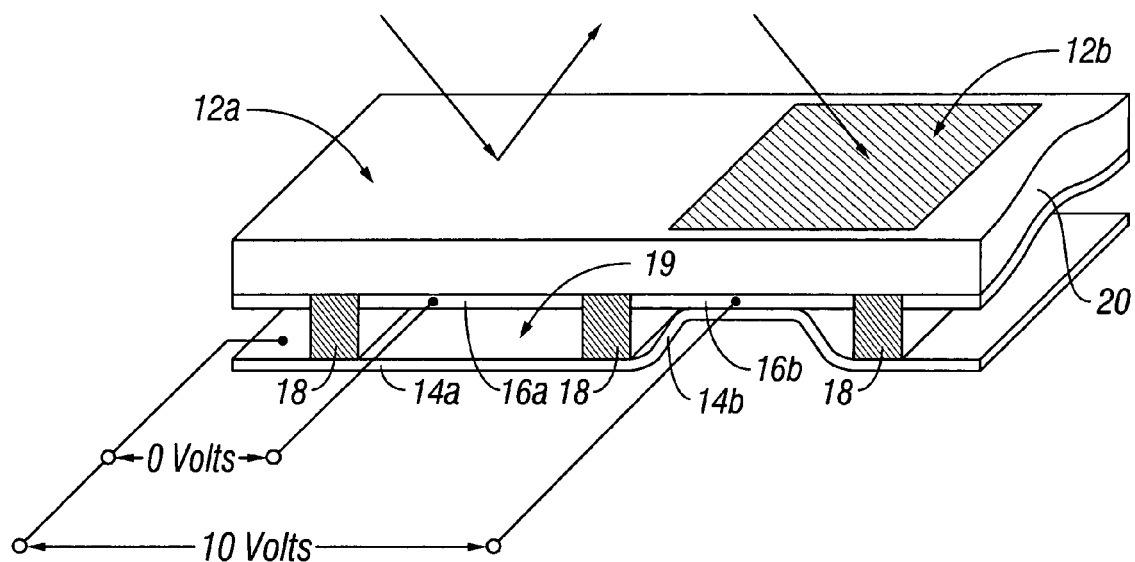
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a relaxed position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers 14a, 14b are separated from the fixed metal layers by a defined gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
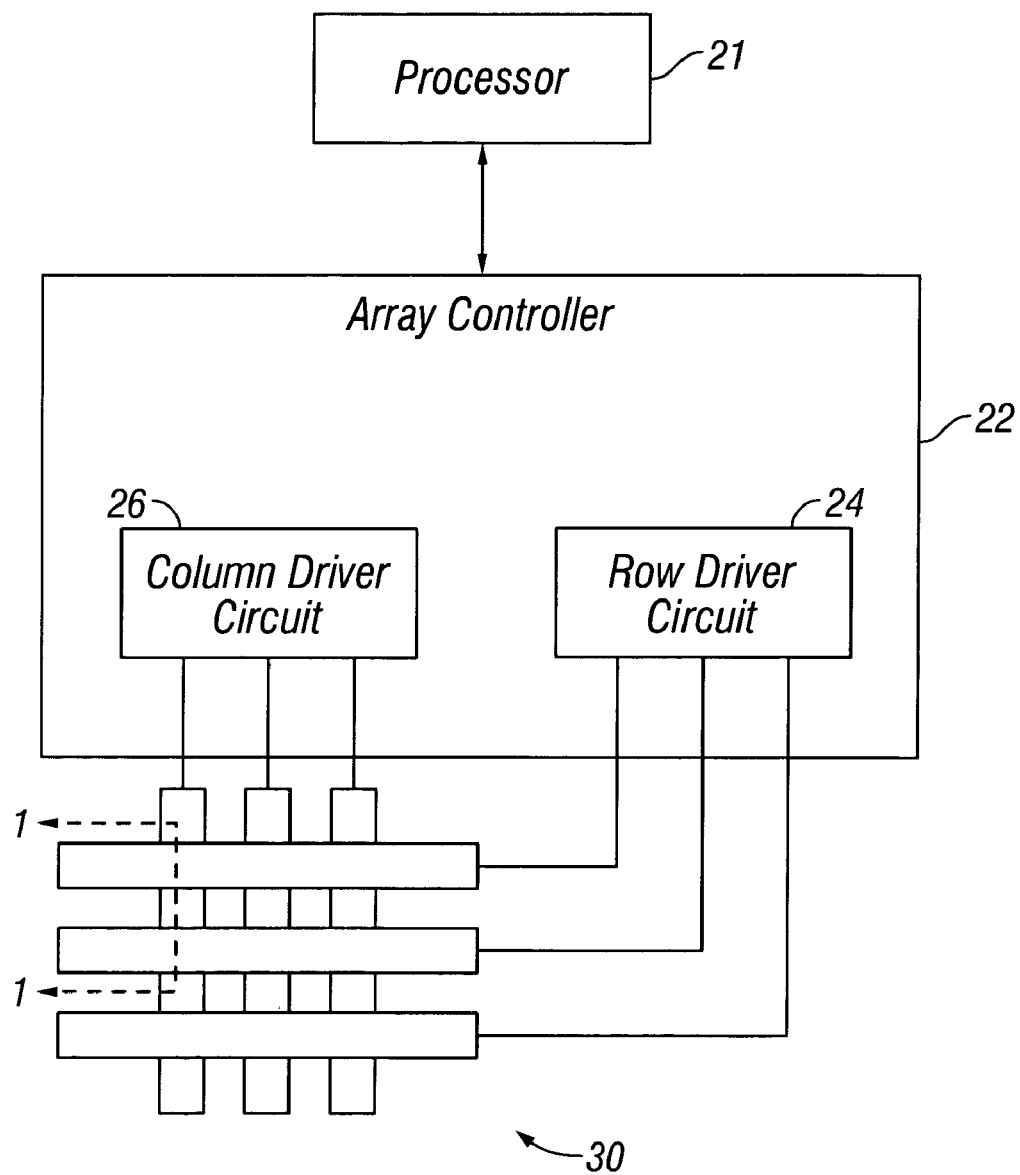
FIG. 2 is a system block diagram illustrating one embodiment of an electronic device incorporating a 3×3 interferometric modulator display.

FIGS. 2 through 4 illustrate one exemplary process and system for using an array of interferometric modulators in a display application.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3A. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3A, the movable layer does not relax completely until the voltage drops below 2 volts. There is thus a range of voltage, about 3 to 7 V in the example illustrated in FIG. 3A, where there exists a window of applied voltage within which the device is stable in either the relaxed or actuated state. This is referred to herein as the "hysteresis window" or "stability window." For a display array having the hysteresis characteristics of FIG. 3A, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3A, 3B:
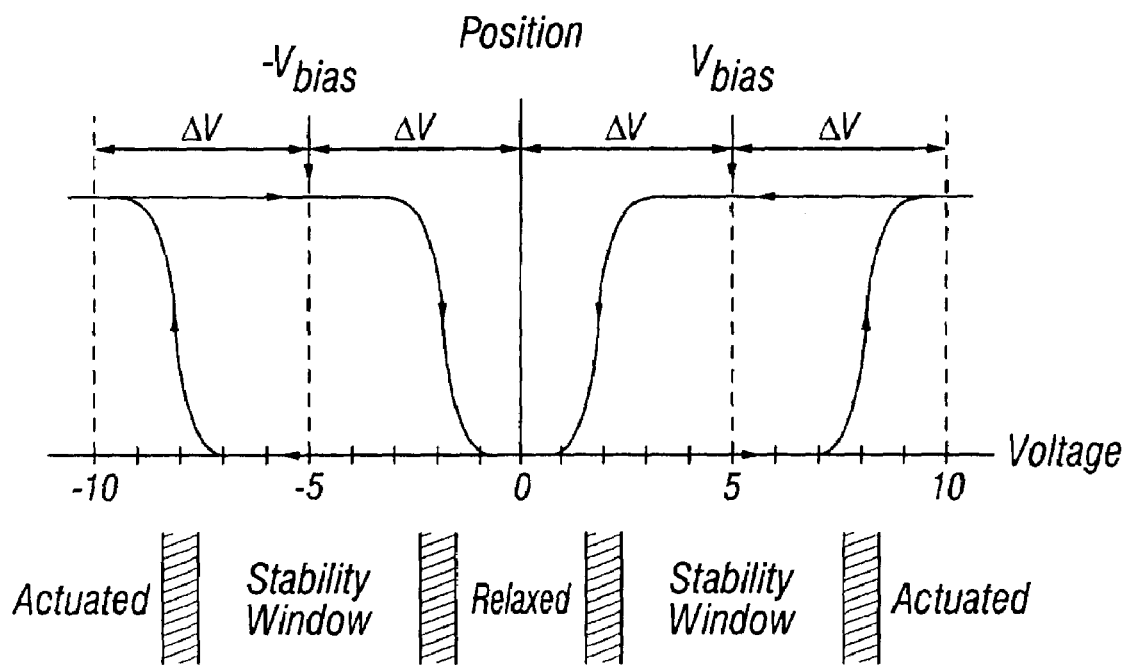
FIG. 3A is a diagram of movable mirror position versus applied voltage for one exemplary embodiment of an interferometric modulator of FIG. 1.
FIG. 3B is an illustration of a set of row and column voltages that may be used to drive an interferometric modulator display.
Figure 4A:
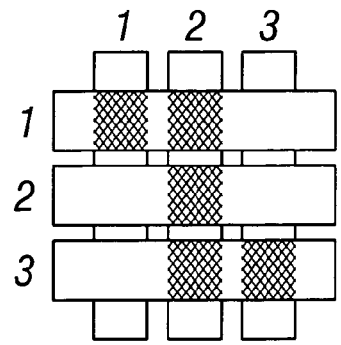
FIGS. 4A and 4B illustrate one exemplary timing diagram for row and column signals that may be used to write a frame of display data to the 3×3 interferometric modulator display of FIG. 2.

FIGS. 3B and 4A illustrate one possible actuation protocol for creating a display frame on the 3×3 array of FIG. 2. FIG. 3B illustrates a possible set of column and row voltage levels that may be used for pixels exhibiting the hysteresis curves of FIG. 3A. In the FIG. 3B embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 3B, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 4B:
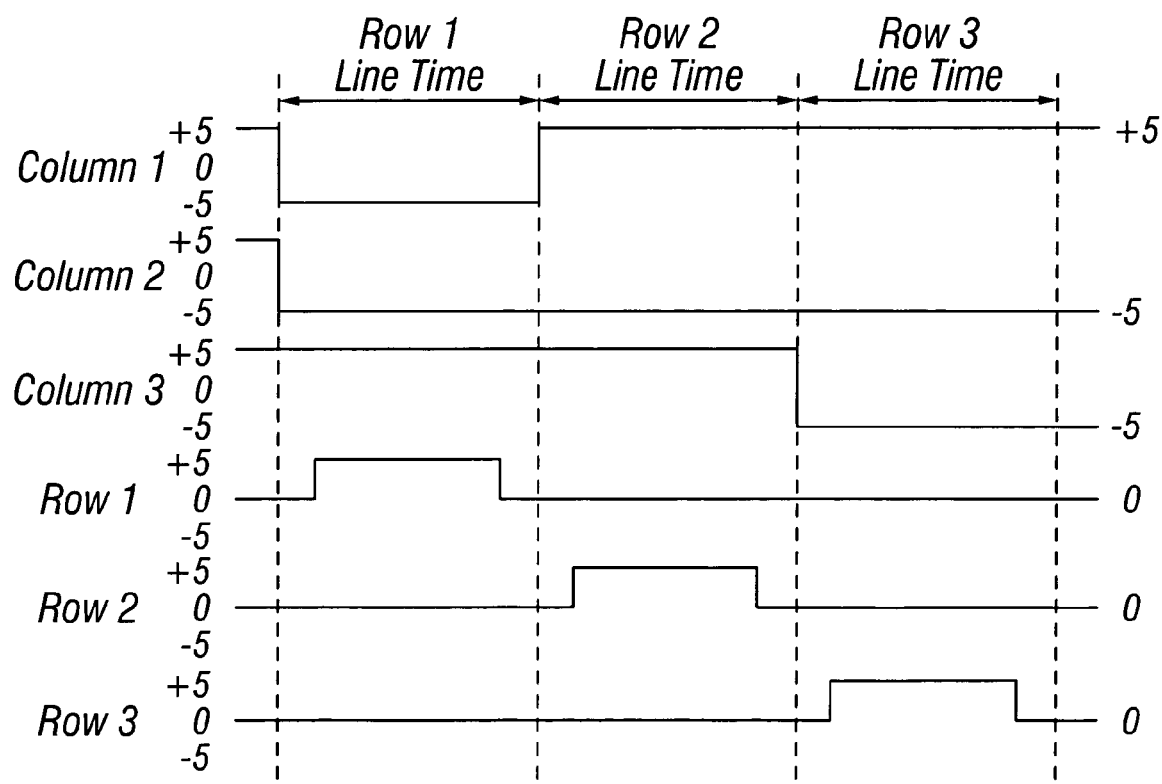

FIG. 4B is a timing diagram showing a series of row and column signals applied to the 3×3 array of FIG. 2 which will result in the display arrangement illustrated in FIG. 4A, where actuated pixels are non-reflective. Prior to writing the frame illustrated in FIG. 4A, the pixels can be in any state, and in this example, all the rows are at 0 volts, and all the columns are at +5 volts. With these applied voltages, all pixels are stable in their existing actuated or relaxed states.

In the FIG. 4A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 4A. After writing the frame, the row potentials are zero, and the column potentials can remain at either +5 or −5 volts, and the display is then stable in the arrangement of FIG. 4A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 5A:
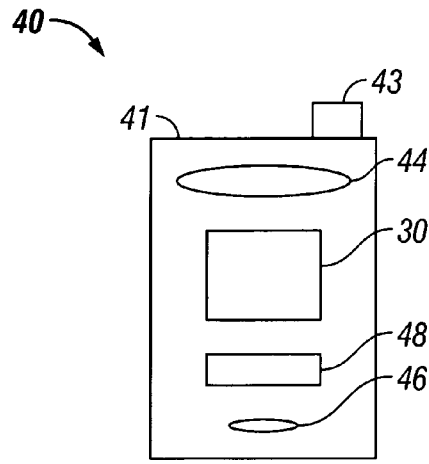
FIGS. 5A and 5B are system block diagrams illustrating an embodiment of a display device.
Figure 5B:
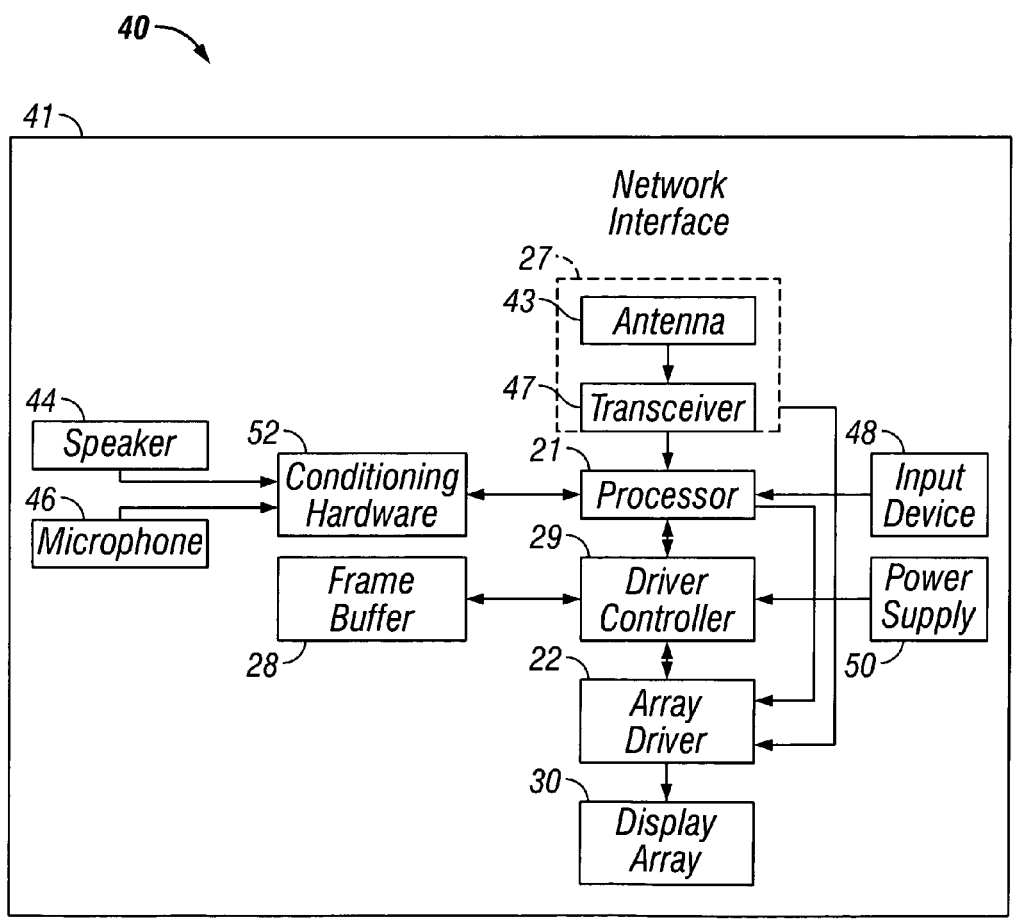

FIGS. 5A and 5B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 5B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 44 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 44, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 6A:
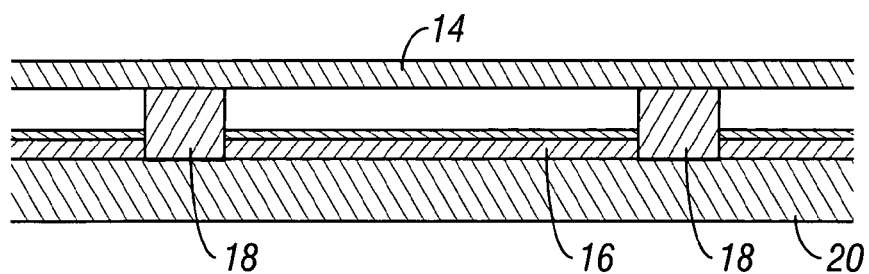
FIG. 6A is a cross section of the device of FIG. 1.
Figure 6B:
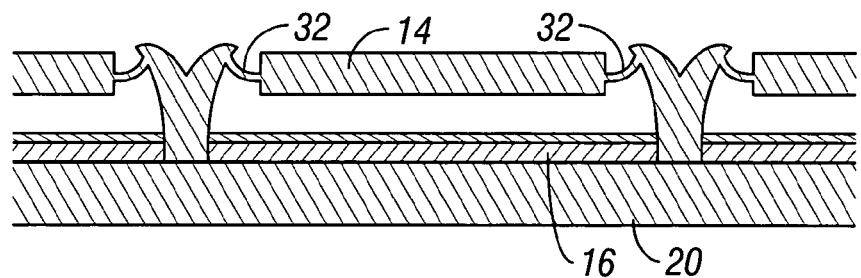
FIG. 6B is a cross section of an alternative embodiment of an interferometric modulator.
Figure 6C:
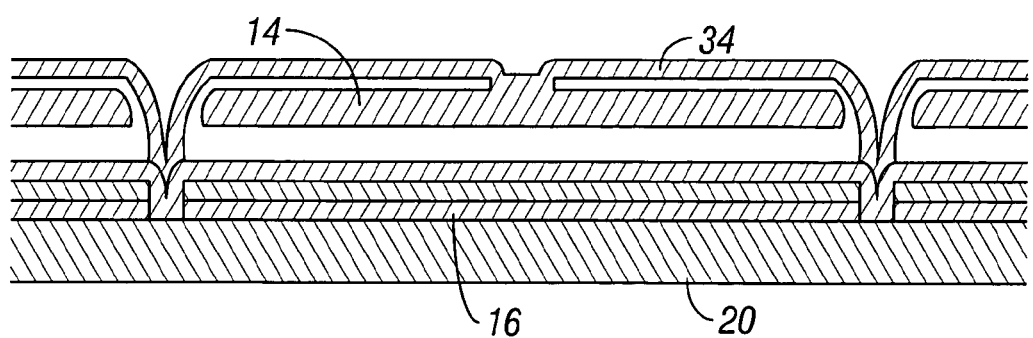
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

As illustrated in FIGS. 1 and 2 and discussed above, each cavity 19 of the pixel array 30 forms a capacitance that is charged by the row driver circuit 24. The capacitance value is relatively large for any particular actuated pixel 12b because the column electrode 14b moves to be very close to the row electrode 16b. Because different numbers of cavities may be actuated during a given row pulse, that impedance that the row driver circuitry sees may be highly variable.

Figure 7:
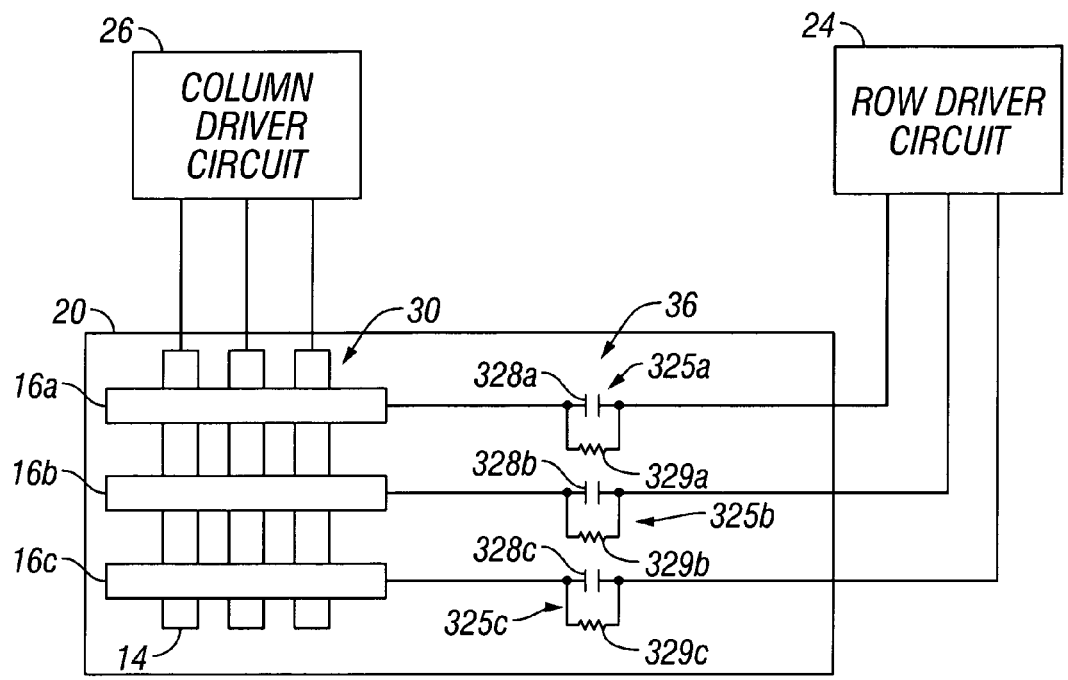
FIG. 7 illustrates an embodiment in which filter circuits are arranged between the row electrodes and the row driver circuit.

FIG. 7 illustrates an embodiment in which filter circuits 325a, 325b, 325c are arranged over a substrate 20 between the row electrodes 16a, 16b, 16c and the row driver circuit 24. It has been found that such filter circuits 325a, 325b, 325c are useful for controlling the impedance driven by the row driver circuit 24. For example, such filter circuits 325a, 325b, 325c may be used to control the stability of the impedance or to allow the impedance to be modifiable for different row pulses. In the illustrated embodiment, each of the filter circuits 325a, 325b, 325c includes a capacitor 328a, 328b, 328c and a resistor 329a, 329b, 329c, respectively. The filter circuits 325a-c, capacitors 328a-c, and resistors 329a-c are examples of electrical devices that may be incorporated into the pixel array 30. Other examples of electrical devices include inductors (not shown in FIG. 7). For example, in an embodiment, a filter includes at least one capacitor, at least one resistor and at least one inductor. Such electrical devices may be incorporated in various regions of the pixel array 30 and may be used for various purposes. For example, electrical devices such as filter circuits, capacitors, resistors, and/or inductors may be arranged between the column driver circuit 26 and the column electrodes 14 (not shown in FIG. 7). Although FIG. 7 illustrates a 3×3 array 30 of interferometric modulators, it will be understood that display panels or devices as described herein may comprise arrays that include hundreds, thousands or even millions of individual interferometric modulators.

In an embodiment, the electrical devices may be incorporated into the pixel array 30 at or near an edge or a peripheral region 36 of the substrate 20. However, in some cases incorporation of the electrical devices at or near the peripheral region 36 of the substrate 20 is inconvenient or undesirable. For example, capacitors having relatively large capacitance values may be utilized in certain arrangements. Such capacitors may have relatively large capacitor plate areas and/or may be used in relatively large numbers, and thus may occupy commensurately large areas at or near the peripheral region 36 of the substrate 20, in some cases reducing the area of the substrate 20 that is available for the pixel array 30.

Various embodiments described herein provide a display device that includes one or more transparent electrical devices that may be incorporated at various locations within the device, including locations within the same region or footprint of the substrate as occupied by the array, particularly between the substrate 20 and the pixel array 30. Thus, for example, the designer of a display device that includes interferometric modulators need not be constrained to place electrical devices such as filters, resistors, capacitors and inductors only at or near the edges of the device. Instead, various embodiments allow increased design flexibility by providing transparent electrical devices that may be included in viewing regions of the device.

It will be understood that a "transparent" electrical device need not transmit 100% of incident radiation at all visible wavelengths. An electrical device is considered "transparent" if, when incorporated into a viewing region of a display device, it is capable of transmitting sufficient incident radiation to permit the device to function in a generally similar or improved manner as compared to an otherwise similar device that does not include the transparent electrical device in the viewing region. In many cases, the transparent electrical device transmits at least about 80% of incident optical irradiation, more preferably at least about 90%. It follows from the foregoing that it is not necessary for all of the materials used to fabricate the transparent electrical device be transparent per se themselves. For example, various materials (such as metals) may be used in such small amounts, and/or be deposited in such thin layers, and/or be dispersed so finely in another material, that transparency is achieved, even in cases in which the bulk material is not ordinarily considered transparent per se.

Various electrical devices are described herein, including filters, resistors, capacitors and inductors. Unless otherwise stated, as used herein those terms have their ordinary meanings as understood by those skilled in the art. For example, a capacitor may be a storage capacitor. Examples of preferred capacitors include those having a capacitance in the range of about 10 picoFarad to about 0.1 microFarad. Examples of preferred resistors include those having a resistance in the range of about 100 Ohms to about one gigaOhm. Examples of preferred inductors include those having an inductance in the range of about one nanoHenry to about 10 microHenry. Each of the electrical devices described herein may be used singly, in groups or two or more like devices, or in groups comprising two or more devices that are different, in all of the embodiments described below. Likewise, it will be understood that various features, though illustrated in the context of a particular embodiment, may also be utilized in other embodiments.

An embodiment provides a display panel comprising an array of interferometric modulators arranged over a transparent substrate, and a transparent electrical device arranged between the array of interferometric modulators and the transparent substrate, the transparent electrical device being electrically connected to the array of interferometric modulators. The transparent electrical device may be a passive electrical device such as a capacitor, resistor, inductor and/or filter. It will be understood that the transparent electrical device may include various combinations of individual electrical components. For example, a filter may include a resistor and a capacitor as illustrated in FIG. 7.

Figure 8A:
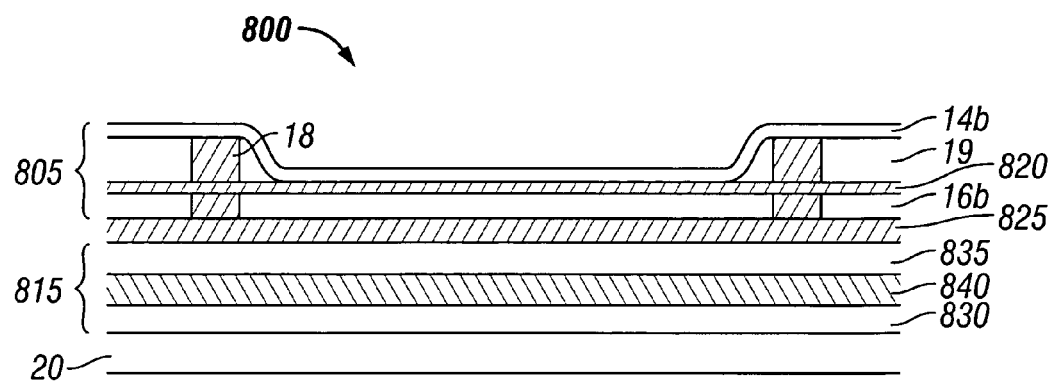
FIG. 8A is a cross-sectional schematic view illustrating a display panel embodiment that includes a transparent capacitor 815.

FIG. 8A is a cross-sectional schematic view illustrating a display panel or device embodiment 800. The display panel 800 includes an interferometric modulator 805 arranged over a transparent substrate 20. The display panel 800 further includes a transparent capacitor 815 arranged between the interferometric modulator 805 and the transparent substrate 20. The interferometric modulator 805 is similar to the interferometric modulator 12b described above, and includes a moveable layer 14b (shown in the actuated position), a fixed layer 16b, and posts 18. The interferometric modulator 805 also includes a dielectric layer 820 arranged over the fixed layer 16b to prevent shorting and control the separation distance between the moveable layer 14b and the fixed layer 16b in the actuated position. The dielectric layer 820 may be formed from a dielectric material such as a silicon oxide. The fixed layer 16b preferably comprises sublayers (not illustrated) of chromium and indium-tin-oxide (ITO), and the moveable layer 14b preferably comprises aluminum. The interferometric modulator 805 is viewed through the transparent substrate 20, and thus the transparent substrate 20 is considered to be on the view side of the display panel 800. Accordingly, the thickness of the fixed layer 16b is selected so that it is transparent during operation of the display panel 800.

In FIG. 8A, the transparent capacitor 815 is separated from the fixed layer 16b of the interferometric modulator 805 by a transparent insulating layer 825. The transparent insulating layer may comprise a silicon oxide. The transparent capacitor 815 comprises a first capacitor layer 830 and a second capacitor layer 835, separated from one another by a capacitor dielectric layer 840. The first and second capacitor layers 830, 835 are preferably formed from a transparent electrical conductor such as ITO. The capacitor dielectric layer 840 preferably comprises a transparent dielectric material such as silicon oxide (k~4.1). Contacts (not shown) electrically connect the transparent capacitor 815 to the array generally (e.g., to the overlying interferometric modulator 805 and/or other interferometric modulators in the array) and to other circuitry, such as drivers.

As noted above, in the illustrated embodiment the transparent substrate 20 is considered to be on the view side of the display panel 800. Thus, the transparent capacitor 815 is an example of a transparent passive electrical device configured to transmit light to the interferometric modulator 805 from the viewing side of the transparent substrate 20. In the illustrated configuration, both the transparent capacitor 815 and the interferometric modulator 805 are attached (directly or indirectly) to the substrate 20 in the array region of the display device into which they are incorporated.

Figure 8B:
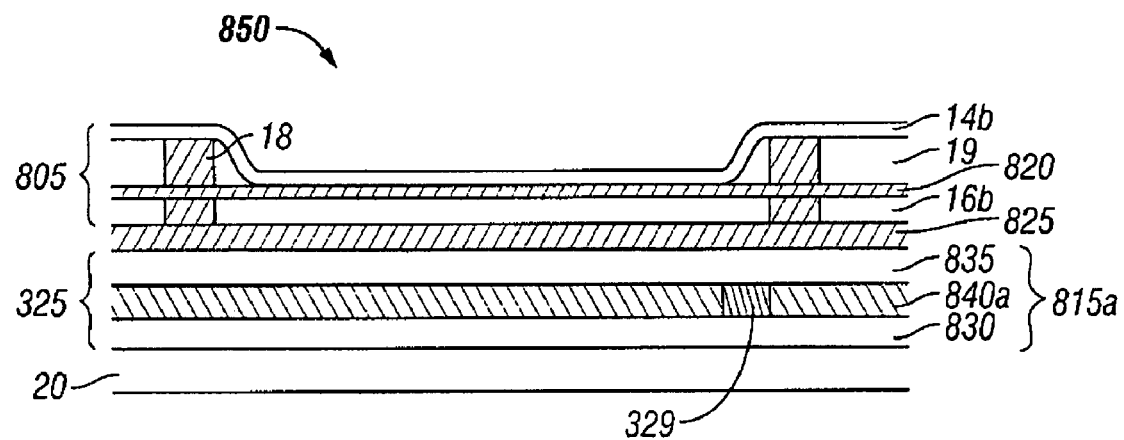
FIG. 8B is a cross-sectional schematic view illustrating a display panel embodiment that includes a transparent filter 325.

FIG. 8B is a cross-sectional schematic view illustrating a display panel embodiment 850. The display panel is similar to the display panel 800 except that it includes a filter 325 in place of the capacitor 815 illustrated in FIG. 8A. The filter 325 includes a capacitor 815a and a resistor 329. The capacitor 815a is similar to the capacitor 815 illustrated in FIG. 8A in that both comprise a first capacitor layer 830 and a second capacitor layer 835. However, in the capacitor 815a, the first and second capacitor layers 830, 835 are separated from one another by a capacitor dielectric layer 840a that includes a transparent resistor 329. The transparent resistor 329 electrically connects the first and second capacitor layers 830, 835. In the illustrated embodiment, the transparent resistor 329 has a resistance of about 10 kΩ.

In other embodiments, including those in which the resistor is not attached to a capacitor and/or those in which the display panel does not include a capacitor, the resistor has a resistance in the range of about 100 Ohms to about one gigaOhm as noted above. The resistor may comprise a transparent insulator (such as a transparent polymer or a silicon oxide) that has been doped with an amount of electrically conductive material (such as a metal) that is effective to provide the resulting resistor with a resistance that is intermediate between that of the insulator and the conductor.

Figure 9:
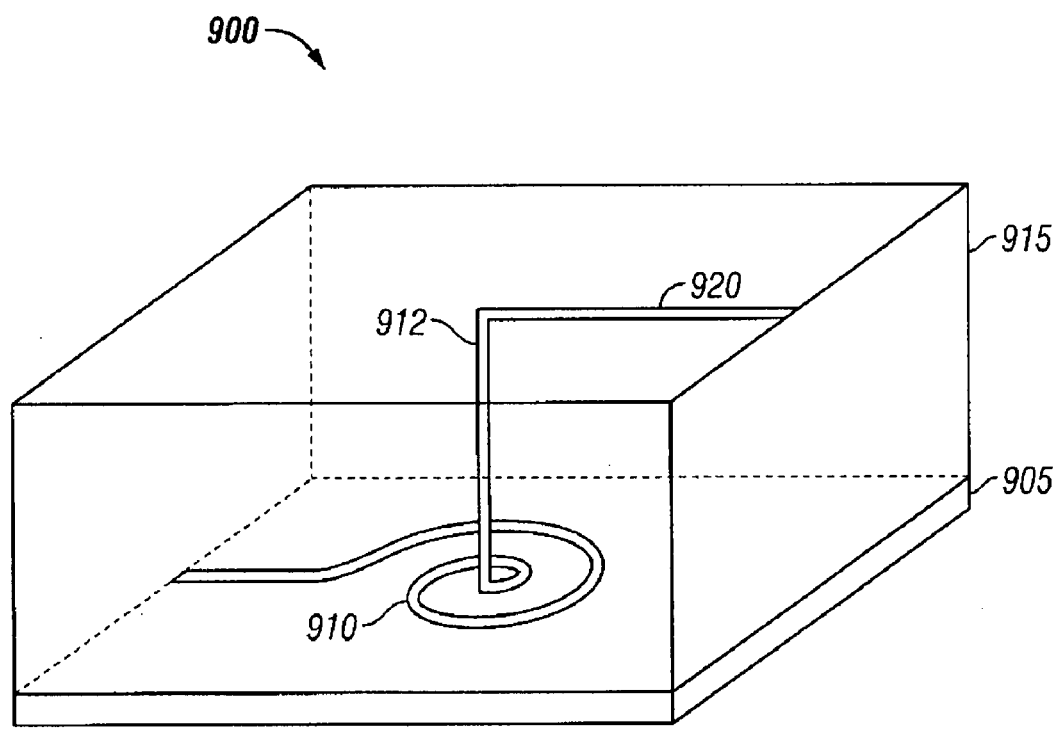
FIG. 9 is a schematic perspective view illustrating an inductor embodiment.

FIG. 9 is a schematic perspective view illustrating an inductor embodiment 900. The inductor 900 comprises a generally spiral conductor 910 that is connected to a second conductor 920. The generally spiral conductor 910 is formed in a first plane 905 and the second conductor 920 is formed in a second plane 915 that is generally parallel to the first plane 905. The generally spiral conductor 910 is connected to the second conductor 920 via a transverse conductor 912 that is generally perpendicular to the first plane 905 and the second plane 915. The inductor 900 may be formed by methods known to those skilled in the art. For example, the plane 905 may comprise a transparent substrate onto which a transparent conductive metal such as ITO is deposited and patterned into a generally spiral shape. The second plane 915 may comprise a layer of insulating material such as a silicon oxide that is deposited over the first plane 905 using known methods. A via may then be formed through the second plane 915 to the second conductor 920 and then filled with a conducting metal such as ITO to form the transverse conductor 912. The second conductor 920 may then be formed by depositing and patterning a transparent metal such as ITO on the second plane 915 to contact the transverse conductor 912. Other methods known to those skilled in the art may also be used, see, e.g., U.S. Pat. Nos. 6,531,945; 6,249,039; and 6,166,422. An inductor such as the inductor 900 may be incorporated into a display panel in a manner similar to that described above for FIGS. 8A and 8B.

It will be understood that display panel embodiments 800, 850 include additional interferometric modulators (not shown in FIGS. 8A and 8B) that are preferably organized in an array 30, e.g., as illustrated in FIG. 7. The transparent electrical device in the display panel (e.g., the capacitor 815 and the filter 325) may be operably connected to the array of interferometric modulators in various ways. In an embodiment, the transparent capacitor 815 is electrically connected to the array of interferometric modulators by electrically connecting the second capacitor layer 835 to the fixed layer 16b and by electrically connecting the first capacitor layer 830 to the row driver circuit 24 as illustrated in FIG. 7. The row driver circuit 24 on the periphery of the substrate 20 or off the substrate 20. Such electrical connections may be accomplished in various ways. For example, with reference to FIGS. 8A and 8B, the second capacitor layer 835 may be electrically connected to the fixed layer 16b by, e.g., forming a via in the transparent insulating layer 825, filling the via with an electrically conducting material such as a metal, then depositing a thin layer of ITO over the transparent insulating layer 825 and the filled-in via to form the fixed layer 16b, such that the electrically conducting material in the filled-in via forms an electrical connection between the second capacitor layer 835 and the fixed layer 16b.

It will be understood that the electrical connections from the transparent capacitor 815 to the array may be made in various ways, and that the transparent capacitor 815 may be connected to a plurality of interferometric modulators. For example, the fixed layer 16b may form a row line for multiple interferometric modulators in an array as illustrated in FIG. 7. The electrical connection of the second capacitor layer 835 to the fixed layer 16b may be made at various places along the length of the fixed layer 16b. The transparent filter 325 may be electrically connected to the array of interferometric modulators in a similar manner.

It will be understood from the foregoing that a particular transparent electrical device in an array of interferometric modulators may be, but need not be, electrically connected to the individual interferometric modulator that is closest to it. Likewise, it will also be understood that a particular transparent electrical device need not be electrically connected to an interferometric modulator. For example, a particular transparent electrical device may be electrically connected to another device that is associated (e.g., packaged or mechanically connected) with the array of interferometric modulators. An embodiment provides a display device comprising: a substrate comprising an array region; an interferometric modulator attached to the substrate in the array region; and a transparent passive electrical device attached to the substrate in the array region. Examples of suitable transparent passive electrical devices include filters, resistors, capacitors and inductors as described above. The transparent passive electrical device(s) may be located in various parts of the array region, such as between an interferometric modulator and the substrate, or may be formed in the periphery. In an embodiment, one or more of the transparent passive electrical device are configured to transmit light to one or more interferometric modulators from a viewing side of the substrate in the array region. Examples of such configurations are described above and illustrated in FIGS. 8A and 8B.

Figure 10:
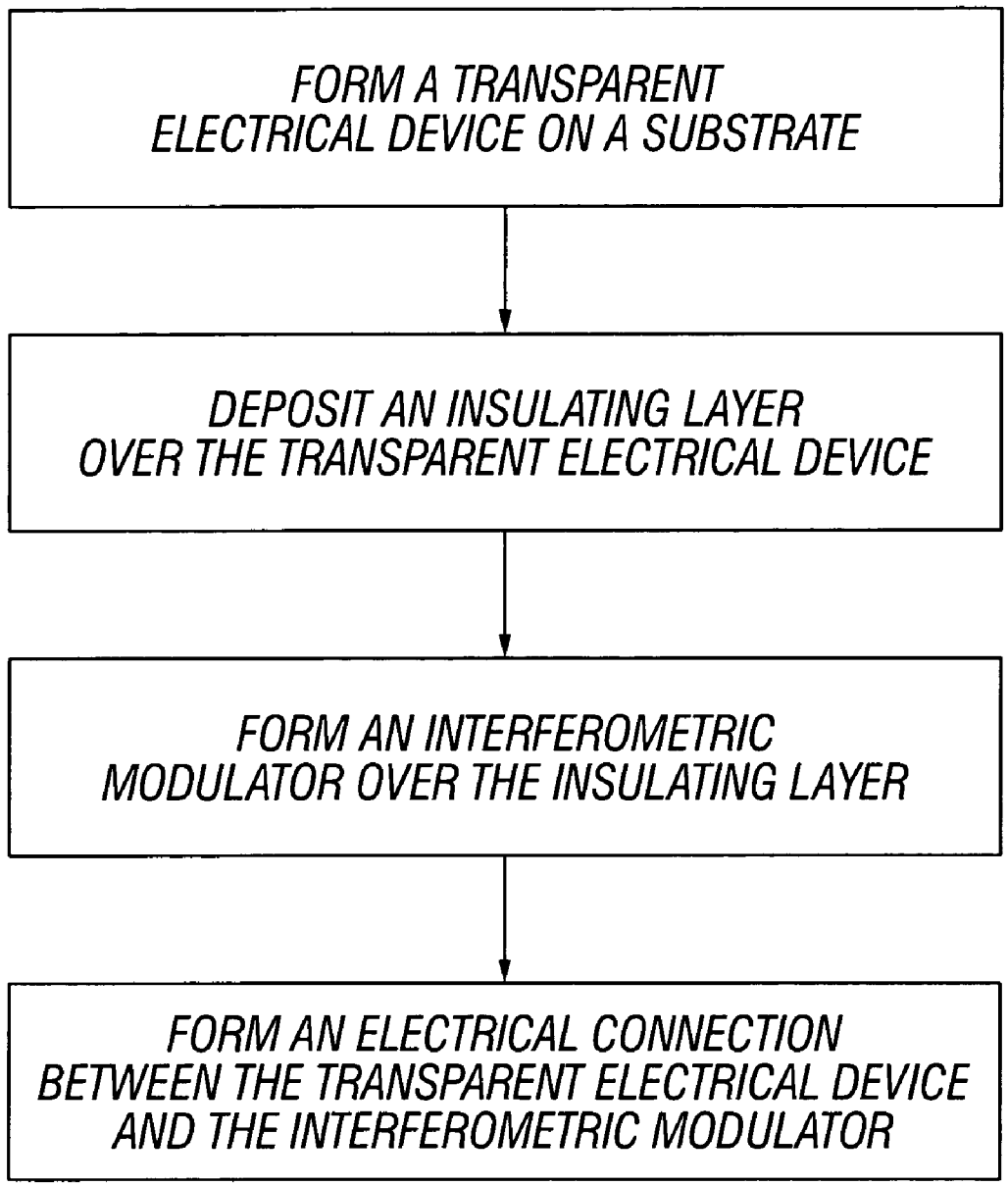
FIG. 10 is a process flow diagram illustrating certain steps in a method of making a display device.

Another embodiment provides a method of making a display device, comprising: forming a transparent electrical device on a substrate; depositing an insulating layer over the transparent electrical device; forming an interferometric modulator over the insulating layer; and forming an electrical connection between the transparent electrical device and the interferometric modulator. FIG. 10 is a process flow diagram illustrating certain steps in such a method. Each of the steps illustrated in FIG. 10 may be conducted in various ways known to those skilled in the art of MEMS fabrication. For example, a wide variety of techniques are known to those skilled in the art, including chemical vapor deposition (including plasma chemical vapor deposition and thermal chemical vapor deposition), spin-on deposition, lithography, etching, patterning, cleaning, soldering, and packaging techniques.

In an embodiment, transparent electrical devices are formed by a combination of chemical vapor deposition, patterning and removal steps. Formation of a transparent electrical device preferably comprises depositing a conductive layer and a dielectric layer, e.g., depositing the first capacitor layer 830 and the capacitor dielectric layer 840 as described above. Formation of the transparent electrical device may further comprise patterning, e.g., patterning a deposited capacitor dielectric layer 840 to define a region to be removed and filled with the transparent resistor 329 to form the capacitor dielectric layer 840a as illustrated in FIG. 8B.

Deposition of an insulating layer over the transparent electrical device may be carried out by, e.g., chemical vapor deposition of silicon oxide; chemical vapor deposition of silicon followed by oxidation to form silicon oxide; or by a spin-on glass (SOG) process. The details of such methods are known to those skilled in the art. Formation of an interferometric modulator over the insulating layer may be conducted in various ways, depending on the configuration of the interferometric modulator, see, e.g., FIG. 6. The previously deposited insulating layer is a suitable substrate upon which to form an interferometric modulator, as a number of known processes for making interferometric modulators involve deposition steps onto glass substrates.

There are numerous methods for forming electrical connections between the transparent electrical device and the interferometric modulator. For example, as described above, the second capacitor layer 835 may be electrically connected to the fixed layer 16b by forming a via in the transparent insulating layer 825 prior to forming the interferometric modulator, filling the via with an electrically conducting material such as a metal, then depositing a thin layer of ITO over the transparent insulating layer 825 and the filled-in via to form the fixed layer 16b, such that the electrically conducting material in the filled-in via forms an electrical connection between the second capacitor layer 835 and the fixed layer 16b. Lateral electrical connections may be formed by deposition and patterning using a conductive metal.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A display panel comprising:
   an array of interferometric modulators arranged over a transparent substrate; and
   a transparent electrical device arranged between the array of interferometric modulators and the transparent substrate, the transparent electrical device being electrically connected to the array of interferometric modulators.

2. The display panel of claim 1 in which the transparent electrical device is selected from the group consisting of a capacitor, a resistor, an inductor and a filter.

3. The display panel of claim 2 in which the transparent electrical device is a capacitor.

4. The display panel of claim 3 in which the capacitor is a storage capacitor.

5. The display panel of claim 2 in which the transparent electrical device is a resistor.

6. The display panel of claim 2 in which the transparent electrical device is an inductor.

7. The display panel of claim 2 in which the transparent electrical device is a filter.

8. The display panel of claim 7 in which the filter comprises a capacitor and a resistor.

9. The display panel of claim 8 in which the filter further comprises an inductor.

10. The display panel of claim 1 in which the array of interferometric modulators comprises at least a first interferometric modulator, the first interferometric modulator comprising a first electrode, a first mirror mechanically coupled to the first electrode, a second electrode, and a second mirror mechanically coupled to the second electrode.

11. The display panel of claim 10 in which the transparent electrical device is electrically connected to the first electrode.

12. The display panel of claim 10 in which the second mirror is moveable relative to the first mirror.

13. The display panel of claim 12 in which the first minor is a reflective surface of the first electrode.

14. The display panel of claim 1 in which the transparent electrical device is a passive electrical device.

15. A display device comprising:
   the display panel of claim 1;
   a processor that is in electrical communication with the display panel, the processor being configured to process image data; and
   a memory device in electrical communication with the processor.

16. The display device of claim 15 further comprising:
   a first controller configured to send at least one signal to the display panel; and
   a second controller configured to send at least a portion of the image data to the first controller.

17. The display device of claim 15 further comprising: an image source module configured to send the image data to the processor.

18. The display device of claim 17 wherein the image source module comprises at least one of a receiver, a transceiver, and a transmitter.

19. The display device of claim 15 further comprising:
an input device configured to receive input data and to communicate the input data to the processor.

20. A display device comprising:
a substrate comprising an array region;
a first interferometric modulator attached to the substrate in the array region, the first interferometric modulator comprising an interferometric cavity; and
a transparent passive electrical device attached to the substrate in the array region.

21. The display device of claim 20 in which the transparent passive electrical device is configured to transmit light to the first interferometric modulator from a viewing side of the substrate in the array region.

22. The display device of claim 20 further comprising a second interferometric modulator attached to the substrate in the array region.

23. The display device of claim 22 in which the transparent passive electrical device is arranged between the substrate and the second interferometric modulator in the array region.

24. The display device of claim 22 further comprising a row line in the array region electrically connected to the first interferometric modulator and to the second interferometric modulator.

25. The display device of claim 24 in which the transparent passive electrical device is electrically connected to the row line.

26. A method of making a display device, comprising:
forming a transparent electrical device on a substrate;
depositing an insulating layer over the transparent electrical device;
forming an interferometric modulator over the insulating layer; and
forming an electrical connection between the transparent electrical device and the interferometric modulator.

27. The method of claim 26 in which forming the transparent electrical device comprises depositing a conductive layer and a dielectric layer.

28. The method of claim 27 in which forming the transparent electrical device further comprises depositing a second conductive layer.

29. The method of claim 27 further comprising patterning at least one of the conductive layer and the dielectric layer.

30. The method of claim 26 in which forming the electrical connection comprises forming a via in the insulating layer.

31. The method of claim 26 in which forming the interferometric modulator comprises forming a first electrode.

32. The method of claim 31 in which the first electrode is insulated from the transparent electrical device by the insulating layer.

* * * * *

UNITED STATES PATENT AND TRADEMARK OFFICE
CERTIFICATE OF CORRECTION

PATENT NO.        : 7,349,136 B2                                              Page 1 of 1
APPLICATION NO. : 11/139108
DATED             : March 25, 2008
INVENTOR(S)       : Clarence Chui It is certified that error appears in the above-identified patent and that said Letters Patent is hereby corrected as shown below:

Col. 8, Line 32, After "screen, a" insert -- pressure- or heat-sensitive membrane. In one embodiment, the microphone 46 is an input --.

Signed and Sealed this

Twenty-third Day of September, 2008

JON W. DUDAS
*Director of the United States Patent and Trademark Office*